US011519389B2

(12) United States Patent
March Nomen

(10) Patent No.: US 11,519,389 B2
(45) Date of Patent: Dec. 6, 2022

(54) ELECTRICAL PROTECTION SYSTEM FOR WIND TURBINES

(71) Applicant: Siemens Gamesa Renewable Energy Innovation & Technology S.L., Sarriguren (ES)

(72) Inventor: Victor March Nomen, Les Fonts (ES)

(73) Assignee: SIEMENS GAMESA RENEWABLE ENERGY INNOVATION & TECHNOLOGY S.L.

( * ) Notice: Subject to any disclaimer, the term of this patent is extended or adjusted under 35 U.S.C. 154(b) by 0 days.

(21) Appl. No.: 17/053,441

(22) PCT Filed: May 3, 2019

(86) PCT No.: PCT/EP2019/061346
§ 371 (c)(1),
(2) Date: Nov. 6, 2020

(87) PCT Pub. No.: WO2019/219404
PCT Pub. Date: Nov. 21, 2019

(65) Prior Publication Data
US 2021/0231107 A1    Jul. 29, 2021

(30) Foreign Application Priority Data
May 14, 2018   (ES) ................ P201800117

(51) Int. Cl.
*F03D 80/30* (2016.01)
*H02G 13/00* (2006.01)

(52) U.S. Cl.
CPC .......... *F03D 80/30* (2016.05); *H02G 13/80* (2013.01)

(58) Field of Classification Search
CPC ................. F03D 80/30; H02G 13/80
(Continued)

(56) References Cited

U.S. PATENT DOCUMENTS

| 6,932,574 B2 * | 8/2005 | Wobben | H02G 13/80 |
| | | | 361/216 |
| 8,643,997 B2 * | 2/2014 | Lyngby | H02H 7/24 |
| | | | 361/117 |

(Continued)

FOREIGN PATENT DOCUMENTS

| EP | 2336560 A1 | 6/2011 |
| EP | 1577551 B1 | 7/2012 |

(Continued)

OTHER PUBLICATIONS

Spanish Search Report dated Nov. 14, 2018 for application No. 201800117.

(Continued)

*Primary Examiner* — Juan G Flores
*Assistant Examiner* — Brian Christopher Delrue
(74) *Attorney, Agent, or Firm* — Schmeiser, Olsen & Watts LLP

(57) ABSTRACT

Provided is an electrical protection system allowing transferring to the ground static electricity accumulated onto the blades of a wind generator, and the lightning current when a lightning strikes onto at least one of the blades or at the rotor, including a first discharging unit configured for continuously discharging to the ground the static electricity accumulated onto the blades, and a second discharging unit configured for discharging to the ground the lightning current when a lightning strikes in at least one of the blades or at the rotor.

20 Claims, 4 Drawing Sheets

(58) Field of Classification Search
USPC .................. 174/2, 3, 5 R, 5 SG, 6, 7, 51
See application file for complete search history.

(56) References Cited

U.S. PATENT DOCUMENTS

| | | |
|---|---|---|
| 2003/0170122 A1 | 9/2003 | Wobben |
| 2009/0038819 A1 | 2/2009 | Molbech |
| 2010/0188790 A1 | 7/2010 | Llorente |
| 2012/0039011 A1 | 2/2012 | Thiel et al. |
| 2012/0057978 A1 | 3/2012 | Nieuwenhuizen |
| 2013/0100570 A1* | 4/2013 | Lyngby .............. F03D 80/30 361/117 |
| 2013/0181457 A1* | 7/2013 | Lyngby .............. H01T 4/08 290/55 |
| 2017/0152839 A1 | 6/2017 | Lyngby et al. |
| 2017/0356426 A1* | 12/2017 | Nieuwenhuizen ..... H02G 13/80 |
| 2019/0383275 A1* | 12/2019 | Pubanz .............. F03D 80/00 |

FOREIGN PATENT DOCUMENTS

| | | |
|---|---|---|
| ES | 2265776 B1 | 2/2008 |
| ES | 2390672 T3 | 11/2012 |
| WO | 0186144 A1 | 11/2001 |
| WO | 2004044419 A1 | 5/2004 |
| WO | 2012016568 A2 | 2/2012 |
| WO | 2013182202 A1 | 12/2013 |
| WO | 2015051800 A1 | 4/2015 |
| WO | 2015086025 A1 | 6/2015 |
| WO | 2016095932 A1 | 6/2016 |

OTHER PUBLICATIONS

International Search Report dated Aug. 12, 2019 for application No. PCT/EP2019/061346.

* cited by examiner

ELECTRICAL PROTECTION SYSTEM FOR WIND TURBINES

CROSS-REFERENCE TO RELATED APPLICATIONS

This application claims priority to PCT Application No. PCT/EP2019/061346, having a filing date of May 3, 2019, which is based off ES Application No. P201800117, having a filing date of May 14, 2018, the entire contents both of which are hereby incorporated by reference.

FIELD OF TECHNOLOGY

The following relates to an electrical protection system for wind turbines which allows transferring static electricity as well as transferring the current of a lightning strike between the wind generator and the rest of the metallic structure.

BACKGROUND

It is currently known that in order to take full advantage of the wind, wind turbines have to be situated in unprotected areas under heavy weather conditions. This location in unprotected areas, as well as the geometry of the wind turbines itself, results in a high probability of attracting lightning strikes onto the wind generator.

Thus, currently, in order to protect the wind turbines from the effects of a lightning strike, components are used which direct the lightning discharge from the tip of the blade to the ground. Habitually, these components comprise an inner cable joining the tip of the blades with an inner beam of the wind generator connected to ground, in such a way that when the lightning strikes the blades or the hub, the current of the lightning strike is sent, through the blade bearing, to said beam so as to direct it to the ground.

Additionally, document US2017/0152839A1 is known to describe a lightning current transfer arrangement for wind turbines which enables, by means of a common circuit, lightning strike current and electrostatic discharge current to be discharged from the blades, or rotor, to the wind generator nacelle.

Nevertheless, this configuration requires a sliding contact that rotates integrally to the rotor in the drip rail, and since it runs about 100,000 km per year, it implies a high wear where maintenance is critical. Another problem is that it is difficult to guarantee the contact or enough contact pressure along the whole distance of the drip rail and, thus, this arrangement can have faults when performing drainage of the lightning current or the static current.

Document ES2265776B1 is also known to describe a contactless lightning transfer arrangement comprising a lightning transfer element, consisting of a first conductor bar fixed to a second insulating bar, wherein the lightning transfer element is fixed to the hub of a wind generator. More particularly, a first end of the lightning transfer element faces a metallic strip located at each blade root of the wind generator at a first distance allowing an electrical jump of a lightning being incident onto the tip of a wind generator blade, whereas a second end faces a drip rail of the wind generator nacelle at a second distance allowing the electrical jump of the lightning. These jumps prevent the lightning from affecting the sensitive parts of the wind generator.

Nevertheless, this arrangement does not allow the static electricity accumulated at the blades to be discharged, which may result in electromagnetic noise in neighbouring equipment.

SUMMARY

An aspect relates to an electrical protection system for wind turbines with blades rotating with respect to a nacelle hub, wherein the electrical protection system allows transferring to the ground the static electricity accumulated at the blades, and the current from a lightning when a lightning strike event takes place in at least one of the blades or at the rotor, wherein the electrical protection system comprises:
  a first discharging unit configured for being in contact with some metallic part of the blade and for continuously discharging to the ground, through the blade bearings, or the hub metallic structure, the static electricity accumulated at the blades, and
  a second discharging unit configured for discharging the current from a lightning to the ground when a lightning event takes place in at least one of the blades or at the rotor.

Wherein, the second discharging unit is configured for being in contact with some metallic part of the blade.

The second discharging unit comprises a first spark gap with a first gap breakdown voltage and a second spark gap with a second gap breakdown voltage.

Particularly, in embodiments of the present invention, spark gap should be understood as any electrical component having two electrodes physically separated between them by a dielectric and which works as a switch at high voltage. That is, at a value underneath a voltage threshold they are an open circuit and above the value they are a closed circuit with the potential difference between electrodes being zero or almost zero.

On the other hand, in embodiments of the present invention breakdown voltage of an electrical component with two terminals electrically separated from each other is to be understood as that voltage from which the two terminals turn to have the same potential (or a very proximate value) because a spark is produced that electrically joins both terminals.

The first discharging unit at least comprises two solid elements selected from: a first solid element, a second solid element, a third solid element, a fourth solid element or a combination thereof.

The first unit comprises the first solid element, the second solid element, the third solid element and the fourth solid element, wherein the first and fourth solid element are connected in series to each other, and the second and third solid element are connected in parallel to each other and to the fourth solid element. Additionally, the first spark gap and the second spark gap are connected in series to each other, and wherein the firs spark gap is also connected in parallel to the first solid element and the second spark gap is also connected in parallel to the fourth solid element.

Alternatively, the first discharging unit comprise the second solid element and the third solid element connected in parallel to each other, and the first spark gap and the second spark gap are connected in series to each other.

Regardless the configuration of the first discharging unit, each solid element comprises a conductive component with an electric resistance, and an insulating component, with a breakdown voltage, connected in parallel to said conductive component.

Additionally, the electrical protection system is in contact with at least a grounding point of the wind generator which the static electricity accumulated at the blades is transferred to, this grounding point being selected from:
- A first grounding point which is any metallic point of the hub,
- A third grounding point which is any metallic element physically connected to the inner track of the blade bearing.

Also, the electrical protection system is in electrical contact with at least a second grounding point, which is any metallic point of the nacelle, which the current from the lightning is transferred to only during a lightning strike event.

The static charge accumulated at the rotor is drained from a first point to the first or third grounding point through the first and/or second conductive component, and the lightning current flows through the spark gap, wherein the first and the second grounding points have the same potential during a lightning strike event.

Particularly, the first solid element is a first receptor that, once installed in the wind generator, is configured for being in contact to a metallic strip of the blade, being electrically equivalent to the first point, and comprising an anti-static resistance bar, according to the first resistive element and with the first breakdown voltage.

The second solid element is a static charge vertical resistance being linked to the blade receptor and configured for discharging the static charge from the first conductive component to the first grounding point.

The third solid element is an insulating beam in parallel with the static charge vertical resistance configured for insulating a second point with respect to the first grounding point, and for preventing the lightning current from flowing along the wind generator main shaft bearings, and for acting as a mechanical support.

The fourth solid element is a second receptor comprising a solid element according to the fourth breakdown voltage and being configured for travelling inside the nacelle drip rail.

Additionally, this protection system comprises a first and a second arm configured to hold and position, respectively, the receptors and direct the current from the lightning strikes from the receptors to the grounding points, each arm comprising a metallic element located at a certain distance, respectively, from the metallic strip of the blade and the drip rail so as to generate the first and second gap breakdown voltage.

It also comprises a metallic beam linked to the upper part of the insulating beam, and configured for being linked to the arms and to the static charge vertical resistance, and a metallic base linked to a metallic component fixed to the outer track of the blade bearing, or the main shaft, and to the insulating beam being electrically equivalent to the first grounding point. Thus, a system is obtained which allows discharging the static electricity being continuously accumulated at the blades, thereby allowing eliminating the electromagnetic radiations produced by discharge at the spark gaps of these systems and discharging electricity from the lightning without damaging the wind generator.

BRIEF DESCRIPTION

Some of the embodiments will be described in detail, with reference to the following figures, wherein like designations denote like members, wherein.

DETAILED DESCRIPTION

Figure 1:
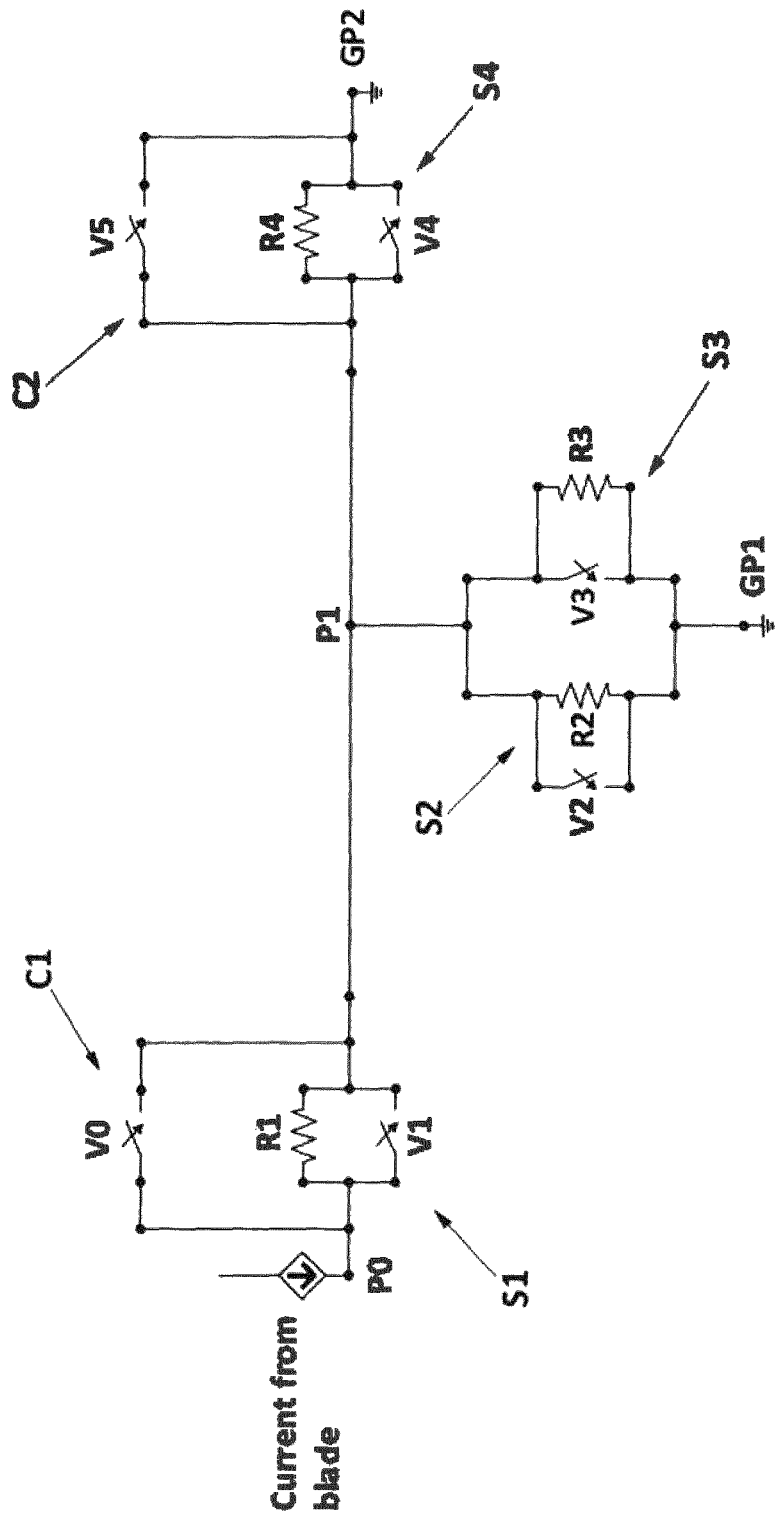
FIG. 1 shows a view of the electrical scheme of a first embodiment of the electrical protection system.

In a first embodiment the protection system, as it is shown in FIG. 1, comprises a first discharging unit configured for discharging the static electricity accumulated onto the blades and a second discharging unit configured for transferring the current from the lightning when a lightning strike event takes place in at least one of the blades or at the rotor.

More particularly, the first discharging unit comprises a first solid element (S1), a second solid element (S2), a third solid element (S3) and a fourth solid element (S4), wherein the first and the fourth solid elements (S1, S4) are connected in series to each other, and the second and third solid elements (S2, S3) are connected in parallel to each other and with the fourth solid element (S4).

Each solid element (S1, S2, S3, S4) comprises a conductive component (R1, R2, R3, R4) with an electrical resistance and an insulating component with a breakdown voltage (V1, V2, V3, V4) connected in parallel with said conductive component (R1, R2, R3, R4).

On the other hand, the second discharging unit comprises a first spark gap (C1) with a first gap breakdown voltage (V0) and a second spark gap (C2) with a second gap breakdown voltage (V5) connected in series to each other, wherein the first spark gap (C1) is also connected in parallel to the first solid element (S1) and the second spark gap (C2) is also connected in parallel to the fourth solid element (S4). The second spark gap (C2) has a gap size depicted as distance D2 in FIG. 4.

Additionally, as it can be seen in FIG. 1, the electrical scheme of the first embodiment of the protection system comprises a first and a second grounding point (GP1, GP2) electrically connected to each other, but located at two different locations of the wind generator.

More particularly, the first grounding point (GP1) is any metallic point of the hub (14), the outer track (12) of the blade bearing (15), or the main shaft (20) since the first grounding point (GP1) is integral to the hub. This first grounding point (GP1) has a degree of freedom with respect to the nacelle thanks to the blade bearing (15).

The second grounding point (GP2) is any metallic point of the nacelle, the drip rail (9) or a track being integral thereto. This second grounding point (GP2) has a degree of freedom with respect to the hub thanks to the main shaft bearings.

The electrical connection between the first and the second grounding point (GP1, GP2) is performed by means of the wind generator main shaft bearing, or bearings.

Thus, when no lightning has struck onto the wind generator blades, all the spark gaps (C1, C2) are open, since the current generated by the static charge is small, at a scale from microamperes (µA) to milliamps (mA), thereby the spark gaps do not activate, and therefore the first discharging unit drains the static charge from the blades between a first point (P0) and a second point (P1) through the first conductive component (R1), and subsequently between the second point (P1) and the first grounding point (GP1) through the second conductive component (R2).

The first point (P0) is a point which is in electrical contact with the lightning arrester of the wind generator blade.

It should be noted that the third and fourth conductive component (R3, R4) have a much higher electrical resistance than the second conductive component (R2), such that the static charge is drained only through the second conductive component (R2), with no static charge drainage between the second point (P1) and the second grounding point (GP2).

The third solid (S3) has mechanical properties so as to act as a support for the second solid (S2).

Thus, when a lightning has struck onto the wind generator blades, the terminal voltage of the first conductive component (R1) is higher than the first gap breakdown voltage (V0), so the current is immediately drained through the first spark gap (C1); and since the second gap breakdown voltage (V5) is much smaller than the second, third and fourth breakdown voltage (V2, V3, V4) the lightning keeps on being drained up to the grounding point (GP2) through the second spark gap (C2). Thus, the current from the lightning is drained from the first point (P0) to the second grounding point (GP2).

The fourth solid element (S4) has mechanical properties and is in contact with the second grounding point (GP2) and without any degree of freedom with respect to this.

Thus, the protection system meets the following conditions:
- The first breakdown voltage (V1) is higher than the first gap breakdown voltage (V0),
- The second breakdown voltage (V2) and the third breakdown voltage (V3) are higher than the first gap breakdown voltage (V0) and the second gap breakdown voltage (V5),
- The fourth breakdown voltage (V4) is higher than the second gap breakdown voltage (V5),
- The first and second conductive component (R1, R2) have an electric resistance comprised between 10Ω and 500 kΩ, and
- The third and fourth conductive components (R3, R4) have an electric resistance higher than 10 MΩ, and thus they can be considered insulating elements.

Figure 2:
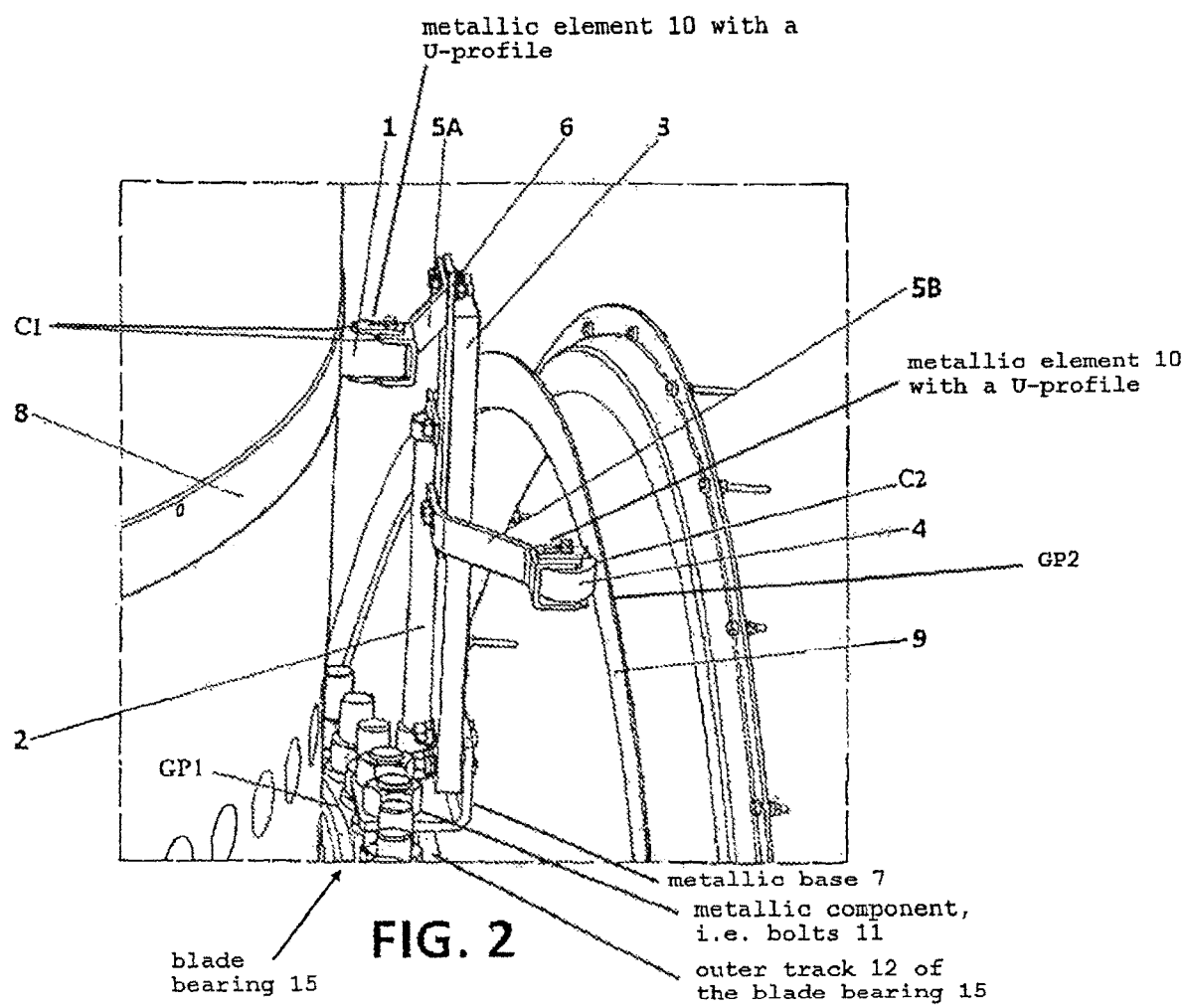
FIG. 2 shows a view of an electrical scheme of a second embodiment of the electrical protection system.

In a second embodiment, as it is shown in FIG. 2, the protection system comprises a third grounding point (GP3) which is the inner track (13) of the blade bearing (15) or any metallic element being physically connected to this track and rotating integrally thereto. This third grounding point (GP3) does not have any degree of freedom, since the third grounding point (GP3) rotates together with the blade bearing (15).

The electrical connection between the third and first grounding point (GP3, GP1) is carried out by means of the blade bearing.

Particularly, the second solid element (S2) is electrically connected to the first point and to the third grounding point (GP3), in such a way that all the static charge accumulated onto the blade, is drained through the second resistive component (R2). With this modification, and without having to drain the static charge between the first and the second point (P0, P1), the first solid element (S1) may have a first conductive component (R1) with a very high resistance, that is, it may act as an insulator and thus there is not static charge drainage between the first and the second point (P0, P1).

More particularly, with no lightning, the static charge is discharged by the second conductive component (R2) directly to the third grounding point (GP3), through the bearing to the hub (3), since the outer track of the blade bearing is fixed at the hub (3) reaching the first grounding point (GP1).

Whereas, with lightning strike, the first and second spark gap (C1, C2) are activated, and the lightning is drained up to the second grounding point (GP2), that is, the drip rail (9) or a track being integral thereto.

Thus, the protection system meets the following conditions:
- The first breakdown voltage (V1) is higher than the first gap breakdown voltage (V0),
- The second breakdown voltage (V2) is higher than the sum of the first breakdown voltage (V0) and the second gap breakdown voltage (V5),
- The third breakdown voltage (V3) is higher than the second gap breakdown voltage (V5),
- The fourth breakdown voltage (V4) is higher than the second gap breakdown voltage (V5),
- The second conductive component (R2) has an electrical resistance comprised between 10Ω and 500 kΩ, and
- The first, third and fourth conductive component (R3, R4) have an electrical resistance higher than 10 MΩ, and therefore these can be considered insulating elements.

Figure 4:
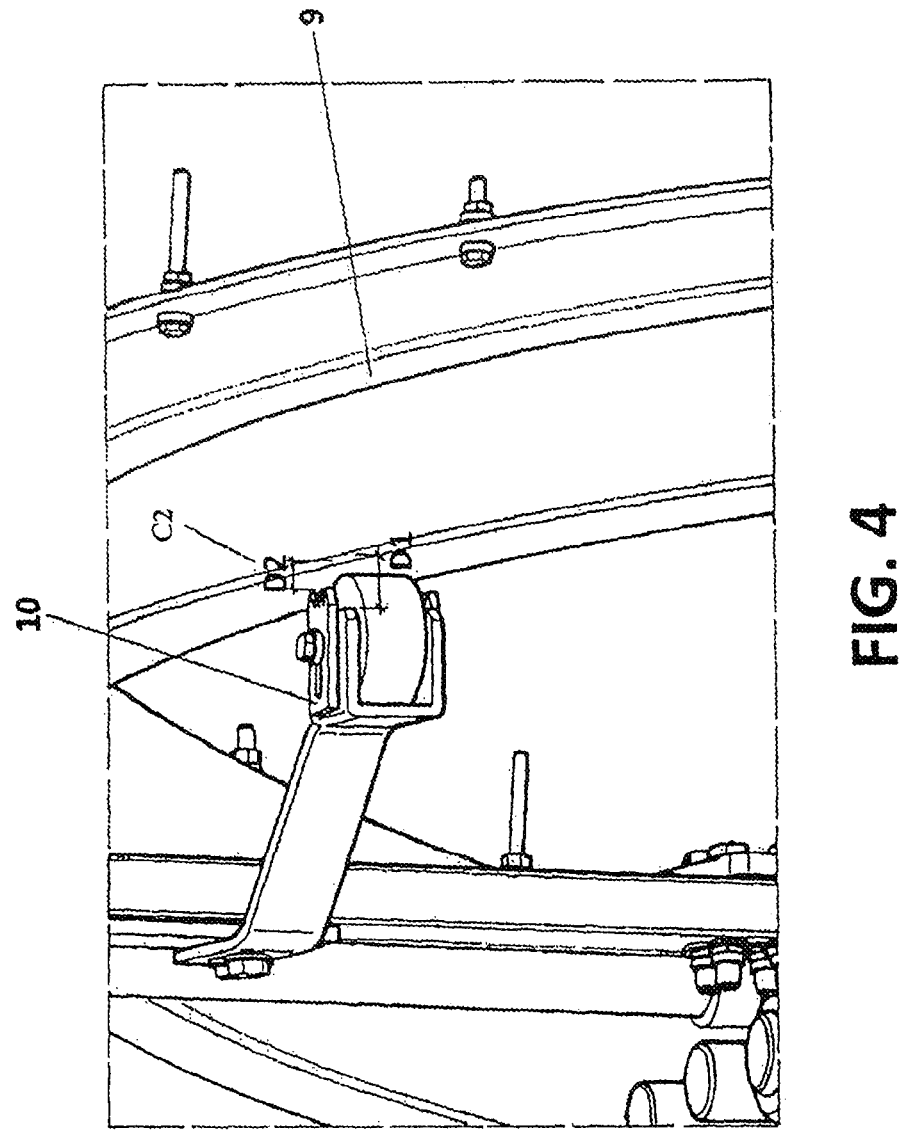
FIG. 4 shows a three-dimension view of the protection system at least one of the first and the second embodiment.

More particularly, as it is shown in FIG. 4, the protection system of the first embodiment according to the electrical scheme of FIG. 1, comprises:
- A first receptor (1) which is designed according to the first solid element (S1), wherein the first receptor (1), once installed in the wind generator, is configured for being in contact with a metallic strip of the blade (8) being electrically equivalent to the first point (P0). The first receptor (1) comprises an anti-static resistance bar, according to the first resistive element (R1), such as a guided contact, a wheel or a roller, in contact with the metallic strip of the blade (8) continuously discharging the static charge thereof.
- A static charge (2) vertical resistance is linked to the blade (1) receptor that is equivalent to the second solid element (S2), therefore the blade (1) is used for discharging the static charge from the first conductive component (R1) to the first grounding point (GP1), thus allowing only the flow of static electricity,
- An insulating beam (3) equivalent to the third solid element (S3) which is located in parallel to the static charge (2) vertical resistance and performing two functions: on the one hand, the insulating beam (3) insulates the second point (P1) with respect to the first grounding point (GP1) so as to prevent the lightning current from flowing along the wind generator main shaft bearings, and on the other hand, the insulating beam (3) acts as a mechanical support of a first and a second arm (5A, 5B). Therefore, the insulating beam (3) is made of insulating materials featuring good mechanical properties capable of holding the protection system. The insulating beam (3) have standard cross-sectional portions, such as L, H, square or rounded profiles, made of plastic material or composite materials (such as fibre-reinforced plastic), in such a way that the third breakdown voltage (V3) must be higher than the first gap breakdown voltage (V0) and the second gap breakdown voltage (V5) so as to guarantee that the lightning strikes cannot flow along it,
- A second receptor (4) which is designed according to the fourth solid element (S4) and wherein the second receptor (4), once installed in the wind generator is configured for being in contact with some metallic part of the nacelle, such as the drip rail (9) which is electrically equivalent to the second grounding point (GP2). The second receptor (4) comprises an anti-static resistance bar, such as a wheel or roller, configured for travelling inside the nacelle in contact with said drip rail (9) and avoiding wear thereof. Additionally, the second spark gap (C2) must be found in parallel with this wheel, The first and second arm (5A, 5B) configured for holding and positioning, respectively, the receptors (1, 4) and driving the lightning current from the receptors up to the grounding points (GP1, GP2). The design of the arms (5A, 5B) must be made so as to avoid any deformation thereof due to distance variations between the hub and the nacelle, and also for preventing any deformation due to the electrodynamic effects of the current from the lightning. Each arm (5A, 5B) comprises a metallic element (10) with a U-profile, the central part of which respectively supporting the receptors (1, 4) and their ends pointing towards the blade and nacelle, respectively. Thus, as it is shown schematically in FIG. 4, the centre of the metallic element (10) is at a distance D1 from the frame (9) which is much bigger than distance D2 being equivalent to the distance between the ends of the metallic element (10) with the frame (9), in order to achieve that the second gap breakdown voltage (V5) is smaller than the fourth breakdown voltage (V4), these same distances being applied so that the first gap breakdown voltage (V0) is smaller than the first breakdown voltage (V1), A metallic beam (6) linked to the upper part of the insulating beam (3), and being configured so as to be linked to the arms (5A, 5B) and with the static charge (2) vertical resistance, and being electrically equivalent to the second point (P1), and A metallic base (7) linked to a metallic component, such as bolts (11) fixed to the outer track (12) of the blade bearing (15), or main shaft (20), and to the insulating beam (3) being electrically equivalent to the first grounding point (GP1).

Thus, the only difference with the protection system of the first embodiment and the protection system of the second embodiment is where the static charge (2) vertical resistance electrically connects.

Figure 3:
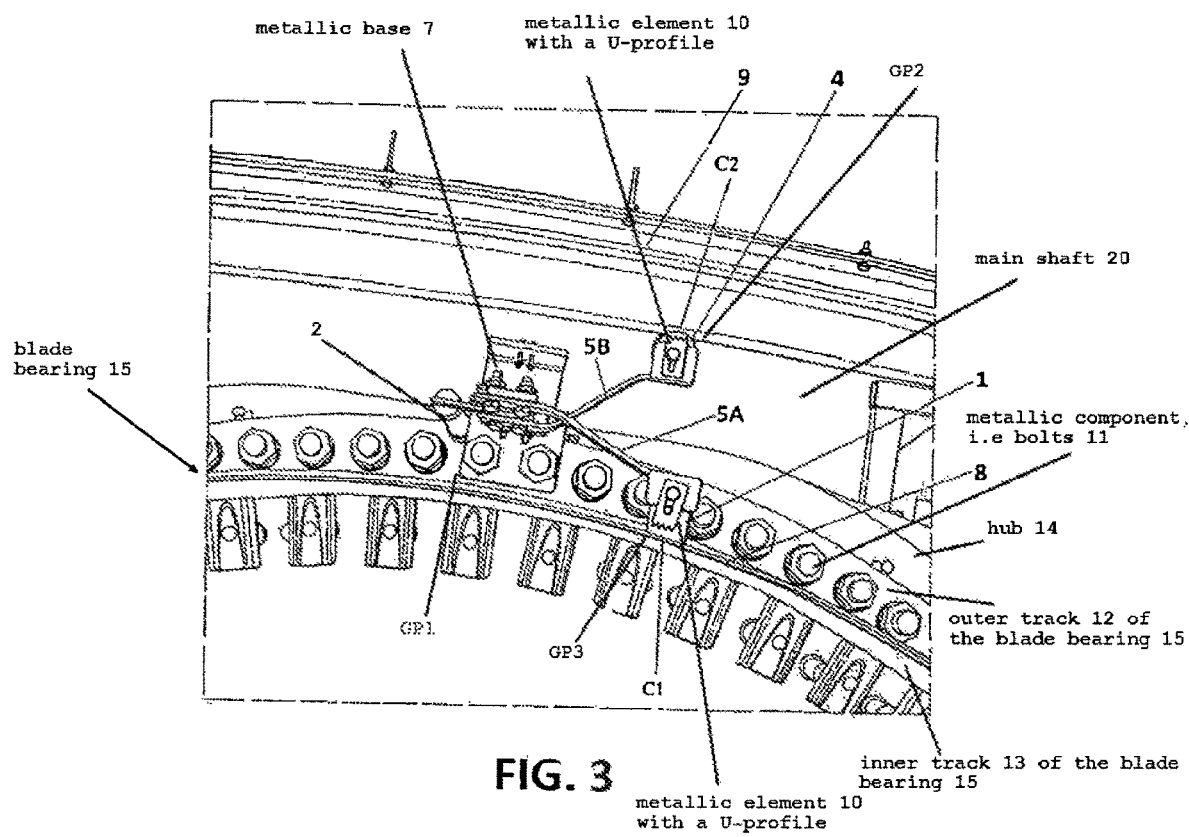
FIG. 3 shows a view of the electrical scheme of a third embodiment of the electrical protection system.

Finally, in a third embodiment, as it is shown in FIG. 3, at least the first and/or the fourth solid element (S1, S4) have been supressed, in such a way that with no lightning, the static charge is discharged through the conductive component (R2) directly to the third grounding point (GP3) through the bearing to the hub, since the outer track of the blade bearing is fixed to the hub, reaching the first grounding point (GP1).

Whereas, with a lightning event, the first and the second spark gap (C1, C2) are activated, and the lightning is drained up to the second grounding point (GP2).

Thus, the protection system meets the following conditions:

The second breakdown voltage (V2) and the third breakdown voltage (V3) are bigger than the first gap breakdown voltage (V0) and the second gap breakdown voltage (V5), The second conductive component (R2) have an electrical resistance comprised between 10Ω and 500 kΩ, and The third conductive component (R3) has an electrical resistance bigger than 10 MΩ, and therefore these can be considered insulating elements.

In this embodiment, the protection system is reduced to the static charge (2) vertical resistance in contact at one of the ends thereof with the lower end of the lightning arrester (11) which in this case is equivalent to the first point (P0), and at the other end in contact with the third grounding point (GP3). This embodiment is implemented to a contactless transfer system against the lightning, characterized by the first and second receptor (1, 4) not being in physical contact with the strip of the blade or with the second grounding point (GP2) of the nacelle.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. An electrical protection system for wind turbines with blades rotating with respect to a hub of a nacelle, wherein the electrical protection system allows transferring to ground static electricity accumulated at the blades and current from a lightning when the lightning strikes onto the blades or at a rotor, wherein the electrical protection system comprises:
   a first discharging unit configured for being in contact to a metallic part of at least one blade of the blades and continuously discharging to the ground, through blade bearings or a metallic structure of the hub, the static electricity accumulated at the blades, and
   a second discharging unit configured for discharging to the ground a lightning current when there is a lightning strike event onto at least one of the blades or at the rotor.

2. The electrical protection system according to claim 1, wherein the second discharging unit comprises a first spark gap with a first gap breakdown voltage and a second spark gap with a second gap breakdown voltage.

3. The electrical protection system according to claim 2, wherein the first discharging unit comprises at least two solid elements selected from: a first solid element, a second solid element, a third solid element, a fourth solid element or combinations thereof.

4. The electrical protection system according to claim 3, wherein the first discharging unit comprises the first solid element, the second solid element, the third solid element and the fourth solid element, wherein the first and the fourth solid elements are connected in series to each other, and the second and third solid elements are connected in parallel to each other and with the fourth solid element.

5. The electrical protection system according to claim 4, wherein the first spark gap and the second spark gap are connected in series to each other, and wherein the first spark gap is connected in parallel to the first solid element, and the second spark gap is connected in parallel to the fourth solid element.

6. The electrical protection system according to claim 3, wherein the first discharging unit comprises the second solid element and the third solid element connected in parallel to each other.

7. The electrical protection system according to claim 6, wherein the first spark gap and the second spark gap are connected in series to each other.

8. The electrical protection system according to claim 3, wherein each solid element comprises a conductive component with an electrical resistance, and an insulating component with a breakdown voltage connected in parallel to the conductive component.

9. The electrical protection system according to claim 3, wherein the electrical protection system is in contact with at least a grounding point of the wind generator which the static electricity accumulated onto the blades is to be transferred to, wherein the grounding point is a first grounding point which is any metallic point from the hub, and wherein the the second discharging unit is in electrical contact with at least a second grounding point, which is any metallic point of the nacelle, to which the lightning current is to be transferred only during a lightning strike event.

10. The electrical protection system according to claim 9, wherein the static charge accumulated in the rotor is drained from a first point to the first grounding point through a first conductive component of the first solid element and a second conductive component of the second solid element.

11. The electrical protection system according to claim 2, wherein the lightning current flows through the first spark gap and the second spark gap, and wherein the first grounding point and the second grounding point have a same potential during the lightning strike event.

12. The electrical protection system according to claim 9, wherein the first solid element is a first receptor that once being installed in the wind generator, is configured for contacting a metallic strip of the blade being electrically equivalent to the first point, and comprising an anti-static resistance bar, according to a first conductive component of the first solid element and with the first breakdown voltage.

13. The electrical protection system according to claim 12, wherein the second solid element is a static charge vertical resistance which is linked to the first receptor and configured for discharging the static charge from the first conductive component to the first grounding point.

14. The electrical protection system according to claim 13, wherein the third solid element is an insulating beam in parallel with the static charge vertical resistance configured for insulating a second point with respect to the first grounding point and avoiding the lightning current along the wind generator main shaft bearings, and for acting as a mechanical support.

15. The electrical protection system according to claim 14, wherein the fourth solid element is a second receptor comprising an electrically insulating element according to the fourth resistive element and with the fourth breakdown voltage and configured for travelling inside a drip rail of the nacelle.

16. The electrical protection system according to claim 15, comprising a first and a second arm configured for holding and positioning, respectively, the first and second receptors and drive the lightning strikes current from the first and second receptors to the first and second grounding points.

17. The electrical protection system according to claim 16, wherein each arm comprises a metallic element located at a determined distance, respectively, from the metallic strip of the blade and the drip rail so as to generate the first and second gap breakdown voltage.

18. The electrical protection system according to claim 17, comprising a metallic beam linked to an upper part of the insulating beam, and configured for linking to the arms and the static charge vertical resistance.

19. The electrical protection system according to claim 18, comprising a metallic base linked to a metallic component fixed to an outer track of at least one of the blade bearings, or main shaft, and to the insulating beam being electrically equivalent to the first grounding point.

20. The electrical protection system according to claim 13, wherein each solid element is made of electrically conductive plastic material, or of plastic material, resins or another non-conductive element enclosing a central element made up of electrical resistances with electric conductivity.

* * * * *